(12) United States Patent
Yu et al.

(10) Patent No.: US 7,698,119 B2
(45) Date of Patent: Apr. 13, 2010

(54) SIMULATOR OF FUEL CELL ON GAS PHASE REACTION

(75) Inventors: Dung-Di Yu, Taoyuan (TW); Yau-Pin Chyou, Taipei (TW); Hung-Yu Wang, Taoyuan (TW); Ruey-Yi Lee, Taoyuan (TW)

(73) Assignee: Atomic Energy Council, Taoyuan (TW)

( * ) Notice: Subject to any disclaimer, the term of this patent is extended or adjusted under 35 U.S.C. 154(b) by 882 days.

(21) Appl. No.: 11/490,057

(22) Filed: Jul. 21, 2006

(65) Prior Publication Data

US 2008/0121052 A1      May 29, 2008

(51) Int. Cl.
G06F 17/50    (2006.01)
H01M 8/02     (2006.01)

(52) U.S. Cl. .............................. 703/13; 703/12; 703/18; 429/12; 429/13

(58) Field of Classification Search .................... 703/6, 703/9, 12, 13, 18; 429/12, 13
See application file for complete search history.

(56) References Cited

U.S. PATENT DOCUMENTS 6,979,508 B2 * 12/2005 Gurin et al. .................... 429/25
7,194,367 B2 *  3/2007 Baker .......................... 702/85
7,396,606 B2 *  7/2008 Tanaka et al. ................. 429/24

OTHER PUBLICATIONS

Dicks et al., "A Fuel Cell Balance of Plant Test Facility", Journal of Power Sources, vol. 71, Issues 1-2, Mar. 15, 1998, pp. 321-327.*
Tucker et al., "Characterization of Air Flow Management and Control in a Fuel Cell Turbine Hybrid Power System using Hardware Simulation", Proceedings of ASME Power Conference 2005, Apr. 2005, pp. 1-9.*
Ordonez et al., "A Novel Fuel Cell Simulator", Power Electronics Specialists Conference, 2005, Jun. 2005, pp. 178-184.*
Ordonez et al.,"Development of a fuel cell simulator based on an experimentally derived model", 2005 Canadian Conference on Electrical and Computer Engineering, May 2005, pp. 1449-1452.*
Faghri et al., "Chalnges and Opportunities of Thermal Management Issues Related to Fuel Cell Technology and Modeling", International Journal of Heat and Mass Transfer, vol. 48, Issues 19-20, Sep. 2005, pp. 3891-3920.*
Qi et al., "Nonlinear State Space Modeling and Simulation of a SOFC Fuel Cell", Proceedings of the 2006 American Control Conference, Jun. 2006, pp. 2534-2538.*

* cited by examiner

*Primary Examiner*—Kamini S Shah
*Assistant Examiner*—Herng-Der Day
(74) *Attorney, Agent, or Firm*—Jackson IPG PLLC

(57) ABSTRACT

The present invention takes place of solid oxide fuel cell (SOFC) in tests. Some tests among them are done to find ways to recycle exhausts of the SOFC. And, some other tests among them are done to evaluate benefits of re-burning the exhausts. All tests save cost and time.

5 Claims, 3 Drawing Sheets

SIMULATOR OF FUEL CELL ON GAS PHASE REACTION

FIELD OF THE INVENTION

The present invention relates to a fuel cell simulator; more particularly, relates to replacing a solid oxide fuel cell (SOFC) to test fuel reactions of the SOFC with saved cost and time for exhausts recycling or for evaluating benefit of re-burning the exhausts.

DESCRIPTION OF THE RELATED ART

Energy price is getting higher and higher day by day; and so it is one of the top issues for every country in the world to find a more efficient energy utilization.

Fuel cells are widely used as power sources for products of 3C (computer, communication and customer utility) and for power plants. The fuel cells mainly utilize electro chemical reaction of hydrogen and oxygen to produce power. The efficiencies of the fuel cells are better than the other power sources used in 3C products or power plants. Among the fuels cells, solid oxide fuel cell (SOFC) is one of the best; yet it is characterized in high temperature exhaust (a temperature between 600 and 1000 Celsius degrees) which is also the most serious technical criterion among criteria for fuel cells. Hence, tests for SOFC becomes very important.

On the other hand, SOFC usually has a very high unit price; and, its structure is too weak to run severe operation test it would be easily broken when the environment has changed quite much and becomes severe. Under such an situation, continuous tests may result in high loss. Consequently, a real fuel cell is not suitable to be used in initial integration tests. Hence, the prior art does not fulfill users' requests on actual use.

SUMMARY OF THE INVENTION

The main purpose of the present invention is to replace a SOFC to test fuel reactions of the SOFC with saved cost and time for recycling exhausts or for evaluating benefit of re-burning the exhausts.

To achieve the above purpose, the present invention is a simulator of fuel cell on gas phase reaction, comprising a connection unit having an anode and a cathode; a combustion unit connected with the anode and the cathode; a sensing and analysis unit connected with the anode and the cathode; a first mass flow control unit connected with the sensing and analysis unit; a first mixing unit connected with the first mass flow control unit; a first heat exchange unit connected with the sensing and analysis unit and the first mixing unit; a second mass flow control unit connected with the sensing and analysis unit; a second mixing unit connected with the second mass flow control unit; and a second heat exchange unit connected with the sensing and analysis unit, the first heat exchange unit and the second mixing unit. Accordingly, a novel simulator of fuel cell on gas phase reaction is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the preferred embodiment according to the present invention;

DESCRIPTION OF THE PREFERRED EMBODIMENT

The following description of the preferred embodiment is provided to understand the features and the structures of the present invention.

Figure 1:
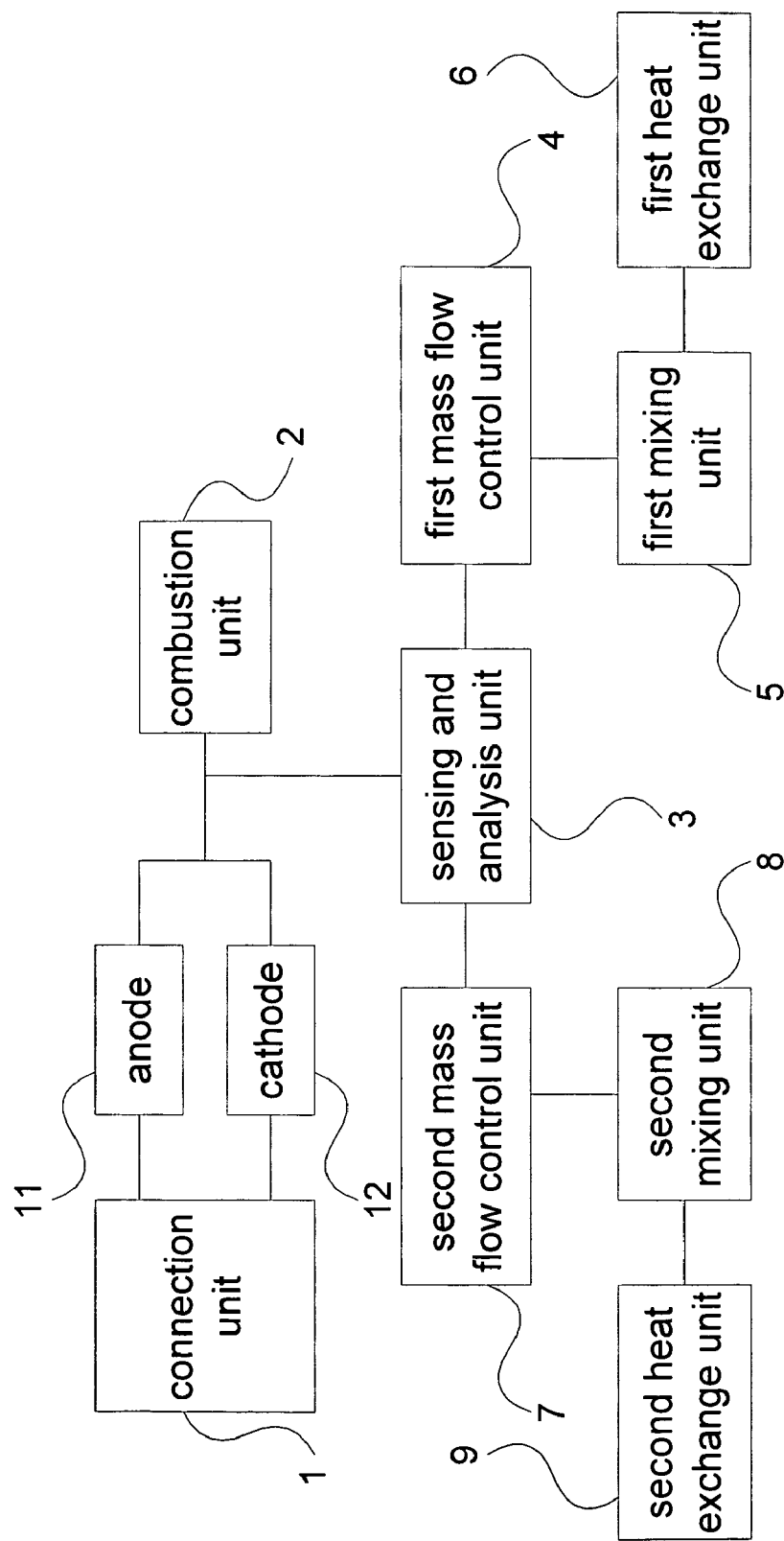
Figure 2:
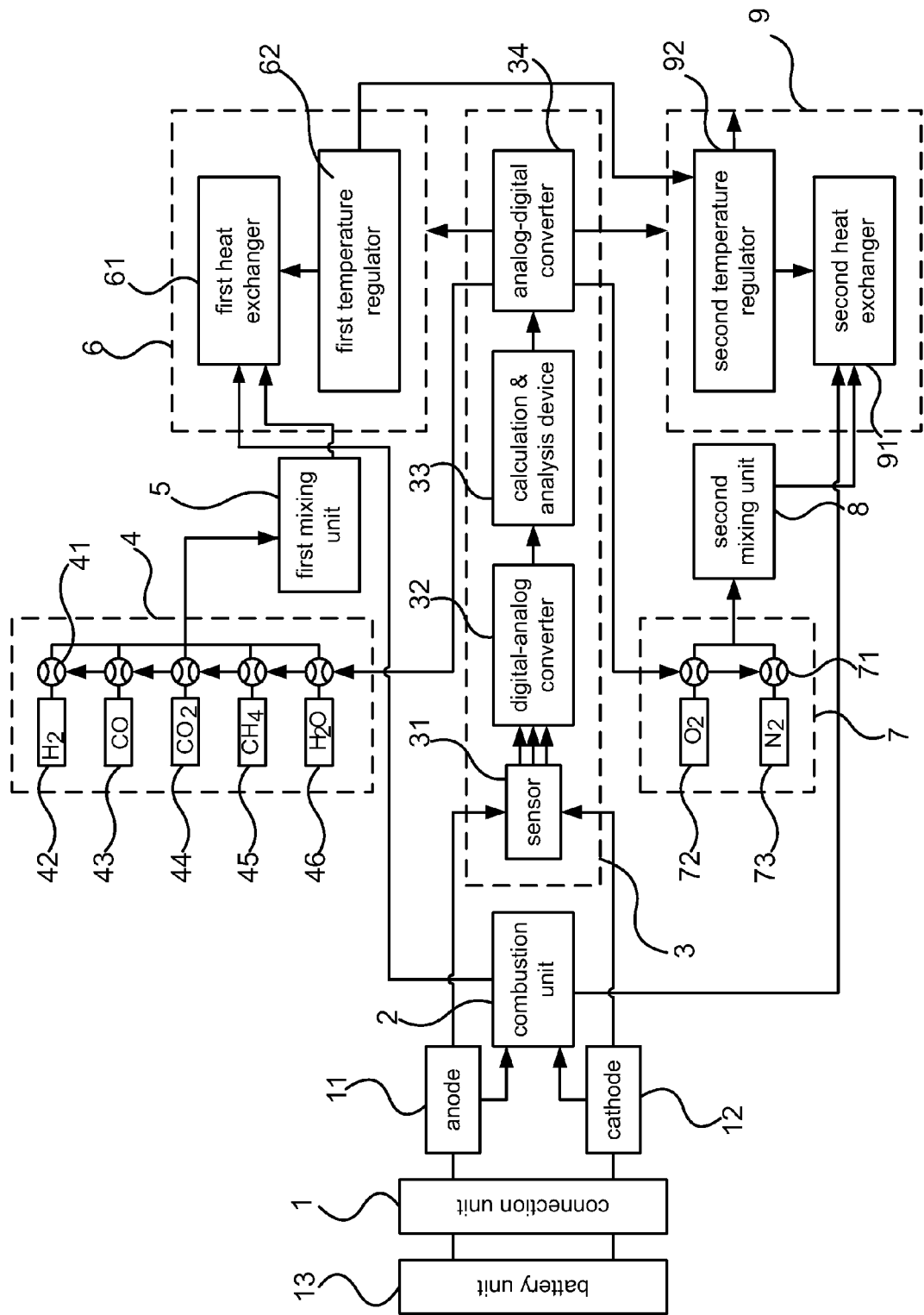
FIG. 2 is the block view.

Please refer to FIG. 1 and FIG. 2, which is a structural view and a block view showing a preferred embodiment according to the present invention. As shown in the figures, the present invention is a simulator of fuel cell on gas phase reaction, comprising a connection unit 1, a combustion unit 2, a sensing and analysis unit 3, a first mass flow control unit 4, a first mixing unit 5, a first heat exchange unit 6, a second mass flow control unit 7, a second mixing unit 8 and a second heat exchange unit 9, where a solid oxide fuel cell (SOFC) is replaced with the present invention to be tested with saved cost and time.

The connection unit 1 has an anode 11 and a cathode 12.

The combustion unit 2 is connected with the anode 11 and the cathode 12.

The sensing and analysis unit 3 is connected with the anode 11 and the cathode 12, comprising a sensor 31; a digital-analog converter 32 connected with the sensor 31; a real-time calculation and analysis device 33 connected with the digital-analog converter 32; and an analog-digital converter 34 connected with the real-time calculation and analysis device 33.

The first mass flow control unit 4 is connected with the sensing and analysis unit 3, coordinated with a mass flow valve 41 for a hydrogen supply 42, a mass flow valve 41 for a carbon monoxide (CO) supply 43, a mass flow valve 41 for a carbon oxide ($CO_2$) supply 44, a mass flow valve 41 for a methane supply 45 and a mass flow valve 41 for a water supply 46.

The first mixing unit 5 is connected with the first mass flow control unit 4.

The first mixing unit 5 is connected with the sensing and analysis unit 3 and the first mixing unit 5, comprising a first heat exchanger 61 and a first temperature regulator 62.

The second mass flow control unit 7 is connected with the sensing and analysis unit 3, coordinated with a mass flow valve 71 for an oxygen supply 72 and a mass flow valve 71 for a nitrogen supply 73.

The second mixing unit 8 is connected with the second mass flow control unit 7.

The second heat exchange unit 9 is connected with the sensing and analysis unit 3, the first heat exchange unit 6 and the second mixing unit 8, comprising a heat exchanger 91 and a temperature regulator 92. Thus, a novel simulator of fuel cell on gas phase reaction is obtained.

Figure 3:
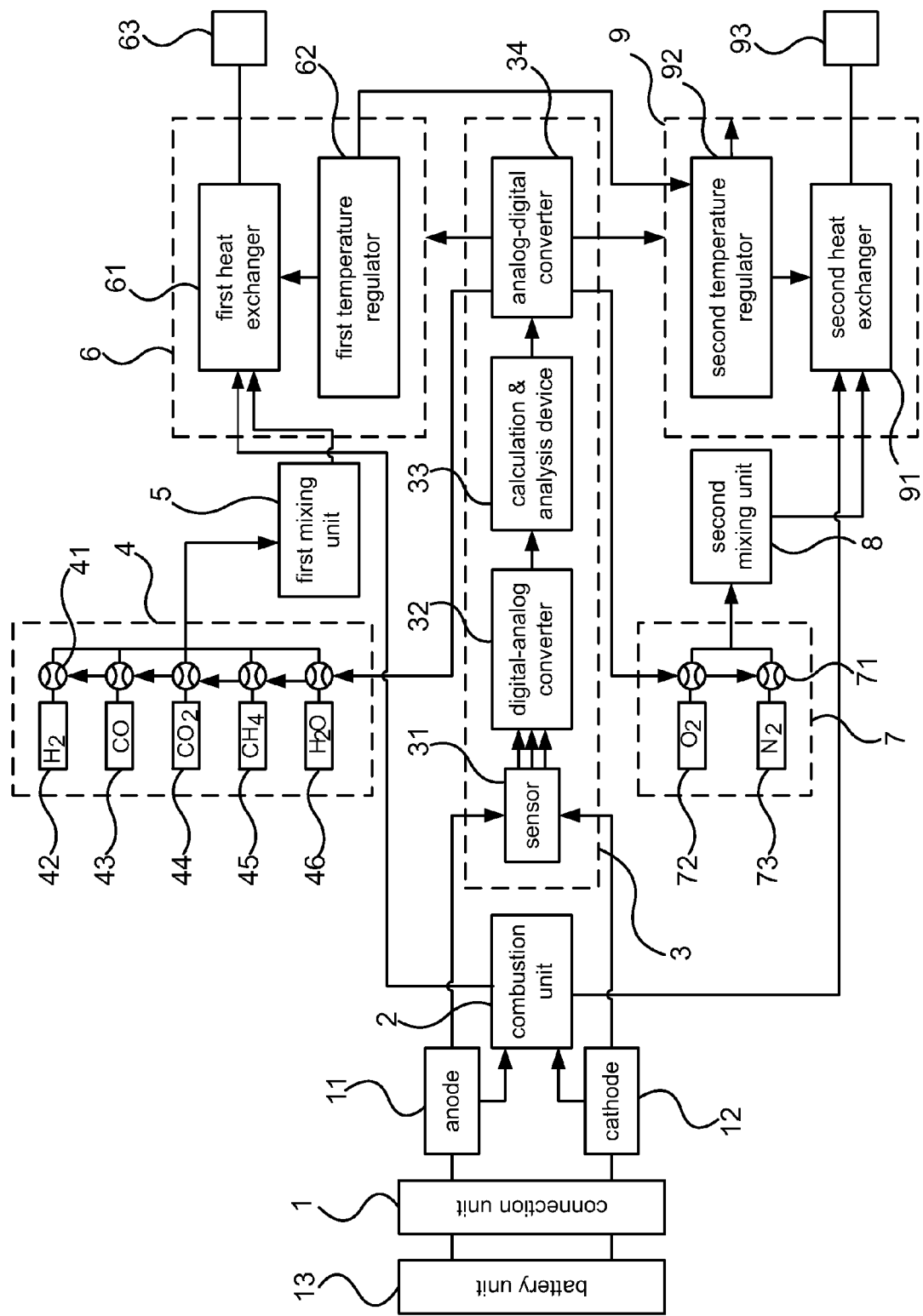
FIG. 3 is the view showing the state of use.

Please refer to FIG. 3, which is a view showing a state of use. As shown in the figure, when the present invention is used as a simulator, a battery unit 13 is connected with a connection unit 1 to mix fuels of the battery unit 13 provided for an anode 11 of the connection unit 1 and a cathode 12 of the connection unit 1 to be burned in a combustion unit 2. At the same time, a sensor 31 of a sensing and analysis unit 3 senses pressures, compositions and temperatures of the fuels for the anode 11 of the connection unit 1 and the cathode 12 of the connection unit 1. The data obtained after the sensing are converted into digital signals by an analog-digital converter 32 to be transferred into a real-time calculation and analysis device 33 for analysis and calculation. After the analysis and calculation, the result data are converted into analog signals by a digital-analog converter 34. Thus, then, a first mass flow control unit 4 and a first heat exchange unit 6 are provided with data of fuel for the anode 11; and a second mass flow control unit 7 and a second heat exchange unit 9 are provided with data of fuel for the cathode 12.

With the data provided, the first mass flow control unit 4 controls amounts of a hydrogen supply 42, a CO supply 43, a $CO_2$ supply 44, a methane supply 45 and a water supply 46 through their mass flow valves 41. After mixing in a first mixing unit 5, the above gases and water are delivered to a first heat exchanger 61 of the first heat exchange unit 6. At this moment, fuels for the anode 11 and the cathode 12, which are mixed and burned in the combustion unit 2, are delivered into the first heat exchanger 61 of the first heat exchange unit 6 (with a portion delivered into the second heat exchange unit 9). A first temperature regulator 62 then figures out a required temperature from the result data from the sensor 31 to heat up or cool down the temperature after the first heat exchanger 61 to simulate an anode exhaust 63 after a reaction at the anode 11.

On the other hand, when data of fuels for the cathode 12 are provided to the second mass flow control unit 7, the second mass flow control unit 7 controls amounts of a oxygen supply 72 and a nitrogen supply 73 through their mass flow valves 71. After mixing in a second mixing unit 8, the above gases are delivered to a second heat exchanger 91 of the second heat exchange unit 9. At this moment, fuels for the anode 11 and the cathode 12, which are mixed and burned in the combustion unit 2, are also delivered into the second heat exchanger 91 of the second heat exchange unit 9. A second temperature regulator 92 then figures out a required temperature from the result data from the sensor to heat up or cool down the temperature after the second heat exchanger 91 to simulate a cathode exhaust 93 after a reaction at the cathode 12.

To sum up, the present invention is a simulator of fuel cell on gas phase reaction, where SOFC is replaced with the present invention to test fuel reaction of the SOFC with saved cost and time The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A fuel cell simulator apparatus simulating gas phase reaction of a solid oxide fuel cell (SOFC), the apparatus comprising:
   a connection unit, said connection unit having an anode and a cathode;
   a combustion unit, said combustion unit connecting to said anode and said cathode;
   a sensing and analysis unit, said sensing and analysis unit connecting to said anode and said cathode and sensing pressures, compositions, and temperatures of fuels for the anode and for the cathode and generating signals corresponding to data for fuel for the anode and data for fuel for the cathode;
   a first mass flow control unit, said first mass flow control unit connecting to said sensing and analysis unit and receiving the signals corresponding to data for fuel for the anode;
   a first mixing unit, said first mixing unit connecting to said first mass flow control unit;
   a first heat exchange unit, said first heat exchange unit connecting to said sensing and analysis unit so as to receive the signals corresponding to data for fuel for the anode and connected to said first mixing unit, the first heat exchange unit including a first temperature regulator, wherein the first heat exchange unit receives fuels for the anode and for the cathode which are mixed and burned in the combustion unit and wherein the first heat exchange unit determines a temperature to simulate an anode exhaust;
   a second mass flow control unit, said second mass flow control unit connecting to said sensing and analysis unit and receiving the signals corresponding to data for fuel for the cathode;
   a second mixing unit, said second mixing unit connecting to said second mass flow control unit; and
   a second heat exchange unit, said second heat exchange unit connecting to said sensing and analysis unit so as to receive the signals corresponding to data for fuel for the cathode, said first heat exchange unit and said second mixing unit, the second heat exchange unit including a second temperature regulator, wherein the second heat exchange unit receives a portion of fuels for the anode and for the cathode which are mixed and burned in the combustion unit and wherein the second heat exchange unit determines a temperature to simulate a cathode exhaust and wherein the first and second temperature regulators operate to obtain the determined temperatures of the anode and cathode exhausts,
   wherein said sensing and analysis unit comprises a sensor, a digital-analog converter, a real-time calculation and analysis device, and an analog-digital converter; and wherein said sensor is connected with said digital-analog converter, said digital-analog converter is connected with said real-time calculation and analysis device, and said real-time calculation and analysis device is connected with said analog-digital converter.

2. The simulator apparatus according to claim 1, wherein said first mass flow control unit is coordinated with a mass flow valve for a hydrogen supply, a mass flow valve for a carbon monoxide (CO) supply, a mass flow valve for a carbon oxide (CO2) supply, a mass flow valve for a methane supply, and a mass flow valve for a water supply.

3. The simulator apparatus according to claim 1, wherein said first heat exchange unit further comprises a first heat exchanger.

4. The simulator apparatus according to claim 1, wherein said second mass flow control unit is coordinated with a mass flow valve for an oxygen supply and a mass flow valve for a nitrogen supply.

5. The simulator apparatus according to claim 1, wherein said second heat exchange unit further comprises a second heat exchanger.

\* \* \* \* \*